Patented June 8, 1926.

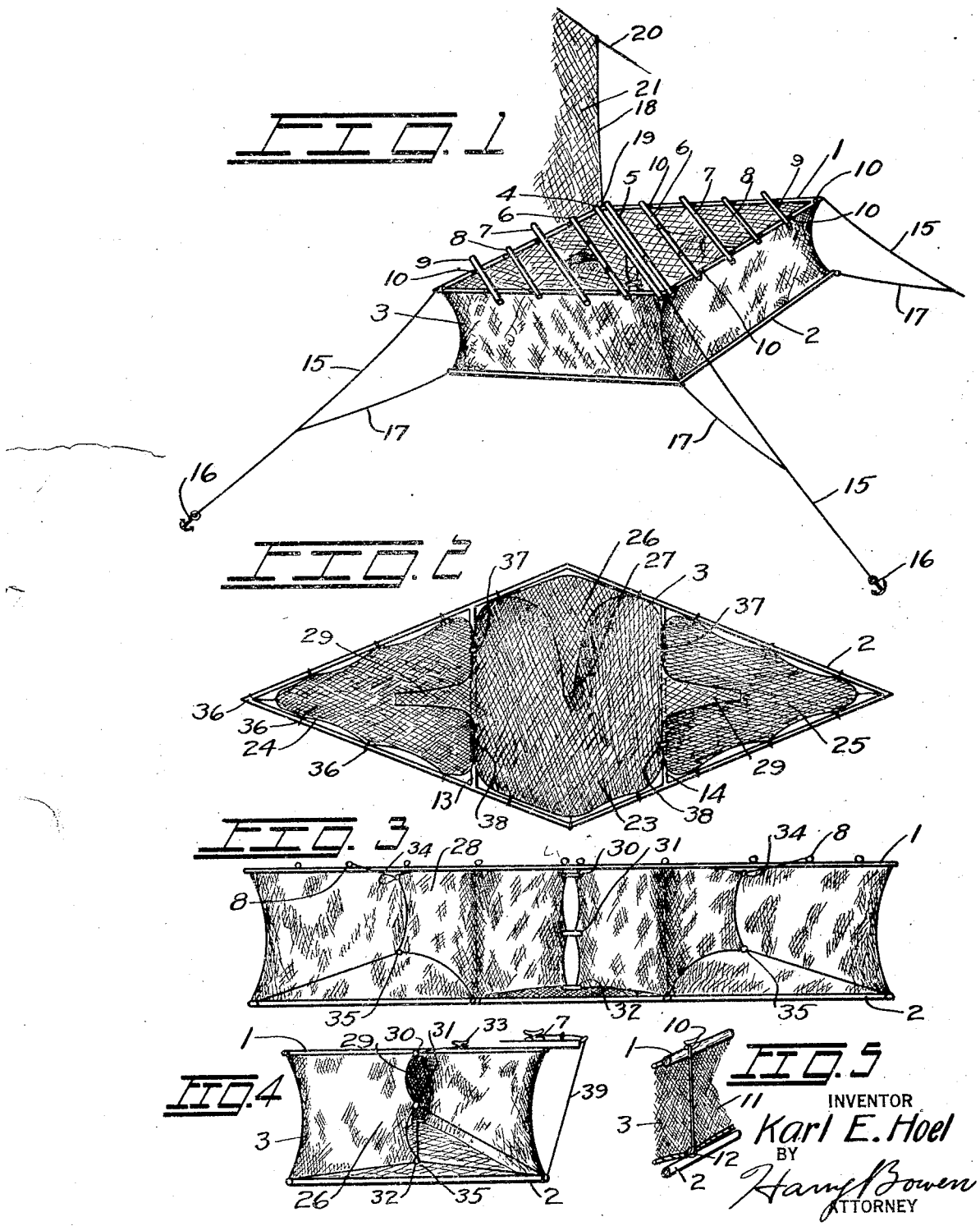

1,588,224

UNITED STATES PATENT OFFICE.

KARL E. HOEL, OF SEATTLE, WASHINGTON.

FLOATING SALMON TRAP.

Application filed February 5, 1925. Serial No. 7,015.

The invention is a floating salmon trap of a diamond shape and having a pot in the center and spillers at each end with suitable tunnels.

One object of the invention is to provide a floating fish trap which is pointed at both ends so that it will present a point to the tide instead of a broad surface.

Another object of the invention is to provide a floating trap which may readily be set up and from which the fish may readily be removed.

And a further object of the invention is to provide a floating salmon trap which is of a simple and economical construction.

With these ends in view, the invention embodies a trap having a diamond shaped upper frame made of logs, a similar lower frame made of metal, a web having a pot in the center and spillers in the two points between the frame, suitable anchor lines leading from the points and a lead line leading from the center.

Other features and advantages of the invention will appear from the following description taken in connection with the drawings, wherein:—

Figure 1 is a view showing the trap as it would appear in use.

Figure 2 is a sectional plan showing the arrangement of the web.

Figure 3 is a longitudinal section through the center of the trap.

Figure 4 is a cross section through the center of the trap.

Figure 5 is a detail showing the method of holding the web downward.

In the drawings, I have shown my trap as it would be constructed wherein numeral 1 indicates the upper frame, numeral 2 the lower frame and numeral 3 the web.

The upper frame 1 may be constructed of logs arranged in the shape of a diamond with two cross members 4 and 5 at the center and other members 6, 7, 8 and 9 between the center and the ends. The frame 1, is also provided with cleats 10, which are arranged at regular intervals and to which the free ends of cords 11, which are attached to the lower edge of the gear or web and which pass through rings 12 on the lower frame 2, are attached. It will be observed that the lower frame 2 is heavy and is supported on the cords 11, so that by tightening these cords the gear or web may be drawn downward to the lower frame, and the free ends of the cords may then be tied to the cleats 10.

The frame 2 is constructed of tubular members as shown in Figure 2 with cross members 13 and 14 between the pot and spillers.

The upper and lower frames are anchored by guy wires or cords 15 extending from the corners of the frame 1 to anchors 16 and guy wires or cords 17 extending from the corners of the frame 2 to the wires or ropes 15 as shown in Figure 1. The lead 18 extends from the point 19 to a cable 20 above and wire 21 may extend below the cable 20 from the lead 18 to a remote point.

The web 3 is made in three sections, one forming the pot 23 at the center and the others forming the spillers 24 and 25 at the points between the frames. The pot is provided with a tunnel 26 extending inward to the point 27 below the lead and other tunnels 29 extend from the pot into the spillers. At the upper edge of the inner ends of the tunnel 26 is a short transverse bar 30 that is attached to the tunnel and is also held to a cleat 33 on top of the frame 1 by a cord as shown in Figure 4. It will be observed that by pulling the cord or the bar 30 the tunnel may be stretched and by securing the cord to the cleat 33, the bar 30 will be supported in the position shown in Figure 4 with the tunnel stretched to its normal position. At the center of this inner end of the tunnel is another bar 31 similar to the bar 30 and this bar is also attached to the tunnel structure and held inward by a cord which is tied to the lower edge of the frame 2 as shown. And at the bottom of this inner edge of the tunnel 26 is another bar 32 which is also held in the position shown by a cord which is attached to the side of the lower frame 2. The inner ends of the tunnel 29 are also provided with similar transverse bars which are indicated by the numerals 34 and 35. The bar 34 is held in the position shown in Figure 3 by a cord which is also attached to a transverse bar 8 on top of the frame 1, and the bar 35 is held in the position shown in Figure 3 by a cord which is attached to the outer corners of the lower frame 2 as shown.

The lower edges of the web are held as shown in Figure 2 at points which are indicated by the numeral 36 and the inner edges of the pot and spillers are held in a similar manner at the points 37 and 38. The ends of the cross members 7 and 9 extend somewhat beyond the edges of the frame as shown in Figure 4 and are provided with ropes 39 for holding the lower frame as shown.

It will be understood that other changes may be made in the construction without departing from the spirit of the invention. One of which changes may be in the design of either the upper or lower frame, another may be in the proportionate sizes of the frames or different compartments and still another may be in the means for attaching the web to the frames.

The construction will be readily understood from the foregoing description. To use the device it may be made and arranged as shown as it will be seen that as fish enter the trap, they will pass through the tunnel 26 and into the pot 23; then from the pot 23 through the tunnels 29 into the spillers 25. It will be observed that with the trap arranged so that the points are with the tide, the tide will strike a pointed surface instead of a broad flat surface, so that it will not float with the tide. It will also be observed that when the cords 11 are loosened from the cleats 10, the web may readily be drawn upward to remove the fish.

Having thus fully described the invention, what I claim as new and desire to secure by Letters Patent, is:—

1. In a salmon trap an upper wood frame, a lower metal frame, said upper and lower frames being diamond shaped a web between the frames, said web having a pot in the central portion and spillers in each of the points a tunnel projecting into said pot, other tunnels projecting into said spillers, means for holding the lower frame to the lower edge of the web and to the upper frame, suitable anchors attached to the points and a suitable lead extending from the point adjacent said pot tunnel.

2. In a floating trap for fish or the like, a diamond shaped web having triangular shaped compartments at the ends and a central compartment, a wood frame at the upper side of the said web and upon which the said web is supported, a metal frame at the lower side of the said web, and means for holding the lower frame to the lower edge of the web and to the upper frame.

3. In a floating fish trap, a diamond shaped web having a pot in the center, a tunnel extending into the said pot, triangular shaped spillers in the points, tunnels extending into the said spillers from the said pot, an upper frame constructed of a material that is lighter than water, a lower frame constructed of a material that is heavier than water, and means for holding the lower frame to the lower edge of the web and to the upper frame.

KARL E. HOEL.